United States Patent
Chen et al.

(10) Patent No.: US 9,887,910 B2
(45) Date of Patent: Feb. 6, 2018

(54) METHOD FOR RETRANSMITTING PACKET, DATA SERVER USING THE SAME, AND PACKET RETRANSMITTING SYSTEM

(71) Applicant: National Chiao Tung University, Hsinchu (TW)

(72) Inventors: Yu-Jia Chen, Hsinchu (TW); Wan-Ling Ho, Hsinchu (TW); Li-Chun Wang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 189 days.

(21) Appl. No.: 14/631,856

(22) Filed: Feb. 26, 2015

(65) Prior Publication Data

US 2016/0205014 A1 Jul. 14, 2016

(30) Foreign Application Priority Data

Jan. 13, 2015 (TW) .............................. 104101088 A

(51) Int. Cl.
*H04L 12/703* (2013.01)
*H04L 12/26* (2006.01)
*H04L 12/24* (2006.01)

(52) U.S. Cl.
CPC .......... *H04L 45/28* (2013.01); *H04L 43/0829* (2013.01); *H04L 41/12* (2013.01)

(58) Field of Classification Search
None
See application file for complete search history.

(56) References Cited

U.S. PATENT DOCUMENTS 6,658,019 B1  12/2003  Chen et al.
8,588,100 B2  11/2013  Wei
(Continued)

FOREIGN PATENT DOCUMENTS

CN       1929481      3/2007
CN     102170613     12/2013
(Continued)

OTHER PUBLICATIONS

Qureshi et al., "An Efficient Network Coding based Retransmission Algorithm for Wireless Multicast," IEEE 20th International Symposium on Personal, Indoor and Mobile Radio Communications, Sep. 13-16, 2009, pp. 691-695.
(Continued)

*Primary Examiner* — Brandon M Renner
*Assistant Examiner* — Jay L Vogel
(74) *Attorney, Agent, or Firm* — JCIPRNet

(57) ABSTRACT

A method for retransmitting packet, a data server using the same and a packet retransmitting system are provided. The packet retransmitting system includes a control server, a network switch, a plurality of upper nodes, and the data server. Terminal nodes download data packets provided by the data server through the upper nodes, respectively. The data server receives missing packet reports in which the data packets correspond to the terminal nodes via the network switch, obtains network topology information related to the terminal nodes from the control server, encodes missing packets in the data packets according to the missing packet reports and the network topology information, and transmits encoded packets encoded from the missing packets to the terminal nodes via the network switch and each of the upper nodes.

11 Claims, 4 Drawing Sheets

(56) References Cited

U.S. PATENT DOCUMENTS

| | | | |
|---|---|---|---|
| 2003/0202505 A1* | 10/2003 | Ozugur | H04L 29/12009 370/352 |
| 2008/0002621 A1 | 1/2008 | Ginzburg et al. | |
| 2010/0005360 A1* | 1/2010 | Begen | G06F 11/1443 714/751 |
| 2010/0061287 A1 | 3/2010 | Josiam et al. | |
| 2010/0214970 A1* | 8/2010 | Brunner | H04L 1/1887 370/312 |
| 2011/0083035 A1* | 4/2011 | Liu | H04L 1/1819 714/4.1 |
| 2013/0007823 A1* | 1/2013 | Mangs | H04L 1/0061 725/109 |
| 2014/0133456 A1 | 5/2014 | Donepudi et al. | |
| 2014/0244966 A1* | 8/2014 | Bosshart | H04L 49/90 711/206 |

FOREIGN PATENT DOCUMENTS

| | | |
|---|---|---|
| CN | 103873216 | 6/2014 |
| CN | 104168209 | 11/2014 |
| CN | 104219032 | 12/2014 |
| TW | 200618528 | 6/2006 |
| TW | 201234880 | 8/2012 |

OTHER PUBLICATIONS

Fang et al., "Reliable Broadcast Transmission in Wireless Networks Based on Network Coding," 2011 IEEE Conference on Computer Communications Workshops (INFOCOM WKSHPS), Apr. 10-15, 2011, pp. 555-559.

Xiao et al, "A Broadcasting Retransmission Approach Based on Random Linear Network Coding," The 9th International Conference for Young Computer Scientists, Nov. 18-21, 2008, pp. 457-461.

Wan-Ling Ho, "A Network Topology Based Network Coded Packet Retransmission Approach for Wireless Multicasting," Master Degree Thesis, National Chiao Tung University, Sep. 2014, pp. 1-58.

"Office Action of Taiwan Counterpart Application", dated Mar. 21, 2016, pp. 1-10.

\* cited by examiner

METHOD FOR RETRANSMITTING PACKET, DATA SERVER USING THE SAME, AND PACKET RETRANSMITTING SYSTEM

CROSS-REFERENCE TO RELATED APPLICATION

This application claims the priority benefit of Taiwan application serial no. 104101088, filed on Jan. 13, 2015. The entirety of the above-mentioned patent application is hereby incorporated by reference herein and made a part of this specification.

BACKGROUND OF THE DISCLOSURE

Field of the Disclosure

The disclosure relates to a method for retransmitting packet, and more particularly, relates to a method for retransmitting packet based on network topology information, a data server using the same and a packet retransmitting system.

Description of Related Art

Under the existing network environment for multimedia data transmission, a network multicast method of the network communication technology is usually required to play multimedia data in real-time for multiparty. The so-called group broadcasting is to simultaneously transmit the same data to multiple receiver hosts that require said data. The hosts belong to the same group may be distributed over different networks to possibly include the same network address, and each of the hosts may join or leave one specific group freely. Accordingly, as compared to the unicast technique which only conducts transmission to one single network node each time, the network multicasting technique is capable of further reducing usage for both network bandwidth and network addresses.

On the other hand, in the wireless network environment, due to problems such as multipath fading and interference in the wireless channel, network packet loss often occurs and leads to a packet retransmission. In the existing technologies, owing to lack of consideration for the connection relation between the nodes in the wireless LAN, retransmitting missing packet by multicasting may cause a massive amount of transmissions for invalid and redundant packets. Such phenomenon not only occupies the network bandwidth and increases a number of times for conducting the packet retransmission but also results in packet loss at destination ends due to the packet collision. Accordingly, it is necessary to provide a method for retransmitting packet that is capable of improving an efficiency of the packet retransmission.

SUMMARY OF THE DISCLOSURE

The disclosure is directed to a method for retransmitting packet, a data server using the same and a packet retransmitting system, which are capable of encoding missing packets based on network topology information and transmitting encoded packets to corresponding terminal nodes by multicasting, so as to effectively improve the efficiency of the packet retransmission.

The disclosure proposes a method for retransmitting packet which is adapted for a data server, and the method includes the following steps. A plurality of data packets is transmitted. A plurality of missing packet reports in which the data packets correspond to a plurality of terminal nodes is received. Network topology information related to the terminal nodes is obtained. Missing packets in the data packets is encoded according to the missing packet reports and the network topology information. A plurality of encoded packets encoded from the missing packets is transmitted.

In an embodiment of the disclosure, the step of encoding the missing packets in the data packets according to the missing packet reports and the network topology information includes the following steps. A plurality of packet combinations of the missing packets is calculated according to the missing packet reports and the network topology information. The missing packets are encoded according to the packet combinations, so as to generate the encoded packets.

In an embodiment of the disclosure, the step of calculating the packet combinations of the missing packets according to the missing packet reports and the network topology information includes the following steps. An upper node to which each of the terminal nodes belongs is determined according to the network topology information. Each of the packet combinations is calculated according to the upper node to which each of the terminal nodes belongs and the corresponding missing packet reports.

In an embodiment of the disclosure, each of the missing packet reports includes an identification of one of the terminal nodes and an indication corresponding to the missing packets, the network topology information includes an address lookup table of the terminal nodes and the upper node to which the terminal nodes belong, and the step of determining the upper node of each of the terminal nodes according to the network topology information includes the following steps. The address lookup table is looked up according to the identification of one of the terminal nodes in each of the missing packet reports to determine the upper node of each of the terminal nodes.

The disclosure proposes a data server, and the data server includes a communication unit, a storage unit and a processing unit. The communication unit is configured to transmit a plurality of data packets. The storage unit is configured to store network topology information. The processing unit is coupled to the communication unit and the storage unit. The processing unit receives a plurality of missing packet reports in which the data packets correspond to a plurality of terminal nodes through the communication unit and obtains the network topology information related to the terminal nodes through the communication unit, and the processing unit encodes a plurality of missing packets in the data packets according to the missing packet reports and the network topology information and transmits a plurality of encoded packets encoded from the missing packets through the communication unit.

In an embodiment of the disclosure, the processing unit calculates packet combinations of the missing packets according to the missing packet reports and the network topology information, and encodes the missing packets according to the packet combinations to generate the encoded packets.

In an embodiment of the disclosure, the processing unit determines an upper node to which each of the terminal nodes belongs according to the network topology information, and calculates each of the packet combinations according to the upper node to which each of the terminal nodes belongs and the corresponding missing packet reports.

In an embodiment of the disclosure, each of the missing packet reports includes an identification of one of the terminal nodes and an indication corresponding to the missing packets, the network topology information includes an address lookup table of the terminal nodes and the upper node to which the terminal nodes belong, and the processing unit looks up the address lookup table according to the identification of one of the terminal nodes in each of the missing packet reports to determine the upper node of each of the terminal nodes.

The disclosure proposes a packet retransmitting system, and the packet retransmitting system includes a control server, a network switch, a plurality of upper nodes, and the data server. The control server is configured to establish network topology information. The network switch is coupled to the control server. The upper nodes are individually coupled to the network switch, where each of the upper nodes provides a network service to a plurality of terminal nodes. The data server is coupled to the control server and the network switch. The terminal nodes download data packets provided by the data server through the upper nodes, respectively. The data server receives missing packet reports in which the data packets correspond to the terminal nodes via the network switch, obtains network topology information related to the terminal nodes from the control server, encodes missing packets in the data packets according to the missing packet reports and the network topology information, and transmits encoded packets encoded from the missing packets to the terminal nodes via the network switch and each of the upper nodes.

In an embodiment of the disclosure, the data server calculates packet combinations of the missing packets according to the missing packet reports and the network topology information, and encodes the missing packets according to the packet combinations to generate the encoded packets.

In an embodiment of the disclosure, the data server determines one of the upper nodes to which each of the terminal nodes belongs according to the network topology information, and calculates each of the packet combinations according to one of the upper nodes to which each of the terminal nodes belongs and the corresponding missing packet reports.

In an embodiment of the disclosure, each of the missing packet reports includes an identification of one of the terminal nodes and an indication corresponding to the missing packets, the network topology information includes an address lookup table of the terminal nodes and one of the upper nodes to which the terminal nodes belong, and the data server looks up the address lookup table according to the identification of one of the terminal nodes in each of the missing packet reports to determine one of the upper nodes to which each of the terminal nodes belongs.

In an embodiment of the disclosure, each of the encoded packets includes address information of one of the corresponding upper nodes, the network switch receives the encoded packets from the data server and transmits each of the encoded packets individually to one of the corresponding upper nodes according to the corresponding address information of each of the encoded packets, and each of the upper nodes multicasts one of the received encoded packets to the terminal nodes.

In an embodiment of the disclosure, the network switch includes an OpenFlow switch, and the control server includes a software-define networking (SDN) controller, the OpenFlow switch integrates the missing packet reports into a missing packet lookup table according to the address information of the corresponding upper nodes, and the software-defined network controller establishes the network topology information based on the missing packet lookup table.

Based on the above, the data server in the packet retransmitting system according to the embodiments of the disclosure is capable of encoding the missing packets required by the terminal nodes according to the network topology information related to the terminal nodes and provided by the control server, and multicasting the encoded packets to the terminal nodes through the upper node to which each of the terminal nodes belong. Accordingly, the packet retransmitting system according to the embodiments of the disclosure is capable of effectively improving the efficiency of the multicasting without increasing computation and transmission costs for wireless nodes.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
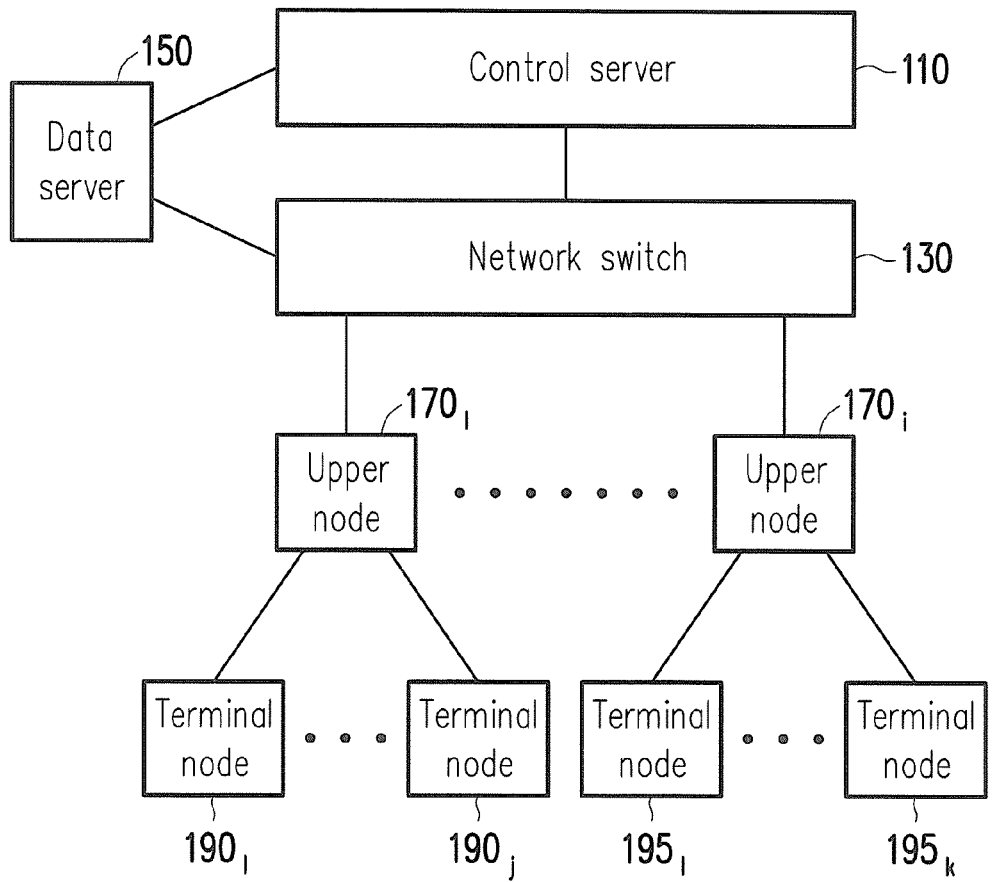
FIG. 1 is a block diagram illustrating a packet retransmitting system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

In a system architecture of a software-define networking (SDN), a SDN controller is used to perform centralized control for network services, and decide, for example, a packet transmission path for all the network entities (e.g., a router, a switch, a terminal device such as a cell phone, a notebook computer or a tablet computer, etc.) in the system architecture, so as to improve a network capacity. In addition, with a packet retransmission mechanism using a network coding method, missing packets may be randomly combined for broadcasting to network nodes that need said missing packets, such that the missing packets may be received by multiple network nodes in one single transmission to thereby reduce an amount of transmissions required by the retransmission. Accordingly, in the embodiments of the disclosure, the network coding and the system architecture of SDN are combined, so that a data server (e.g., a multimedia data provider server) may encode the missing packets according to network topology information provided by a control server (e.g., the SDN controller) and multicast encoded packets to the terminal devices by corresponding upper nodes (e.g., an access point (AP), the switch or the router). As such, the network coding may be optimized for missing or error packets of the different terminal nodes, so as to improve efficiencies of the packet retransmission and the multicasting. Reference will now be made to the present preferred embodiments of the disclosure, and it will be apparent to those skilled in the art that adjustments and applications can be correspondingly made to the following embodiments based on demands instead of being limited by the content in the following description.

FIG. 1 is a block diagram illustrating a packet retransmitting system according to an embodiment of the disclosure. Referring to FIG. 1, a packet retransmitting system 10 includes a control server 110, a network switch 130, a data server 150, upper nodes $170_1$ to $170_i$, terminal nodes $190_1$ to $190_j$ and $195_1$ to $195_k$, where i, j and k are positive integers. It should be noted that, according to design requirements for applying the embodiments of the disclosure, amounts of the upper nodes $170_1$ to $170_i$ and the terminal nodes $190_1$ to $190_j$ and $195_1$ to $195_k$ are changeable and not particularly limited in the present embodiment of the disclosure.

The control server 110 may be a SDN controller or other network entities (e.g., a router, a server, a personal computer, etc.) including SDN functions (e.g., network topology and packet routing in the packet retransmitting system 10). The control server 110 is configured to establish network topology information related to the upper nodes $170_1$ to $170_i$, the terminal nodes $190_1$ to $190_j$ and $195_1$ to $195_k$ (e.g., address information of the upper nodes $170_1$ to $170_i$ (e.g., an Internet Protocol (IP) address, a media access control (MAC), etc.), ports for coupling the upper nodes $170_1$ to $170_i$ to the network switch 130 or the upper nodes $170_1$ to $170_i$ respectively coupled to the terminal nodes $190_1$ to $190_j$ and $195_1$ to $195_k$).

The network switch 130 may be an OpenFlow switch, any switches or routers which support the OpenFlow protocol, or a virtual switch (e.g., the OpenFlow vSwitch) configured in an electronic device (e.g., a personal computer, a notebook computer, a smart phone, etc.), and the network switch 130 is coupled to the control server 110 and the data server 150.

The data server 150 may be a server capable of storing and providing data including multimedia files, documents and so on, such as a multimedia server, a database server or a cloud server, but a type of the server is not limited to the above. The data server 150 is coupled to the control server 110 and the network switch 130.

Figure 2:
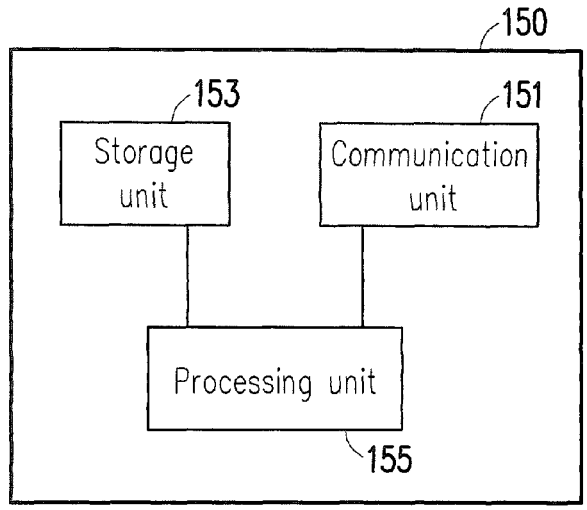
FIG. 2 is a block diagram illustrating the data server according to an embodiment of the disclosure.

FIG. 2 is a block diagram illustrating the data server 150 according to an embodiment of the disclosure. Referring to FIG. 2, the data server 150 includes a communication unit 151, a storage unit 153 and a processing unit 155. The communication unit 151 is coupled to the control server 110 and the network switch 130 in a wired manner (e.g., a cable, an optical fiber, etc.) or in a wireless manner (e.g., a radio, etc.), so that the data server 150 is capable of transmitting data packets (e.g., the data packets of multimedia data, document, system data, etc.).

The storage unit 153 may be any movable or fixed type of a random access memory (RAM), a read-only memory (ROM), a flash memory, a hard Disk drive (HDD), a solid state drive (SSD) or other similar devices, or a combination of the above-mentioned devices. The storage unit 153 is configured to store the network topology information provided by the control server 110 and aforesaid data packets, and the network topology information may refer to related description of the control server 110, which is not repeated hereafter.

The processing unit 155 is, for example, a central processor (CPU) or other programmable devices for general purpose or special purpose such as a microprocessor and a digital signal processor (DSP), a programmable controller, an application specific integrated circuit (ASIC), a system on chip (SoC) or other similar elements or a combination of above-mentioned elements. The processing unit 155 is coupled to the communication unit 151 and the storage unit 153. In the present embodiment, the processing unit 155 is configured to process all tasks for the data server 150 in the present embodiment.

The upper node $170_1$ to $170_i$ may be an access point (AP), a switch, a router, a hub supporting the Wi-Fi technology, or any type of base stations supporting mobile network technologies (e.g., wideband code division multiplex access (WCDMA), long term evolution (LTE), etc.) proposed by the third generation partnership project (3GPP), which are capable of providing the network services to the coupled (connected through the wireless or the wired method) terminal nodes $190_1$ to $190_j$ and $195_1$ to $195_k$ (e.g., the cell phone, the notebook computer or the tablet computer). The network switch 130 includes, for example, a plurality of ports, so that the upper nodes $170_1$ to $170_i$ may be coupled to the ports, respectively.

Figure 3:
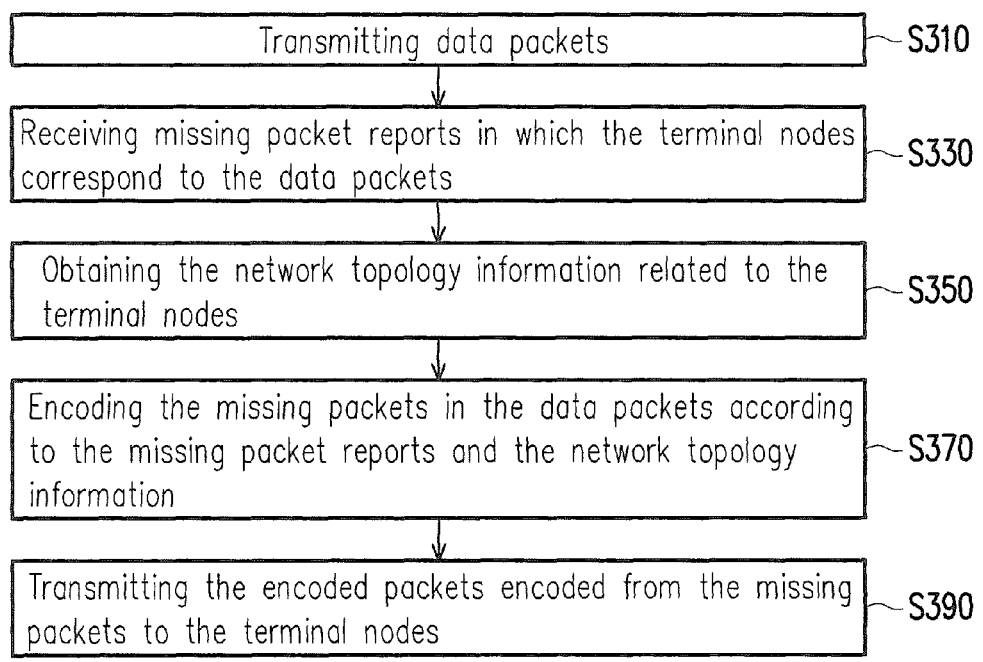
FIG. 3 is a flowchart illustrating method for retransmitting packet of the data server according to an embodiment of the disclosure.

FIG. 3 is a flowchart illustrating method for retransmitting packet of the data server 150 according to an embodiment of the disclosure. Referring to FIG. 3, the method of the present embodiment is adapted for the packet retransmitting system 10 of FIG. 1 and the data server 150 of FIG. 2. Hereinafter, various components in the packet retransmitting system 10 of FIG. 1 and the data server 150 of FIG. 2 are used to describe the method for retransmitting packet according to the embodiments of the disclosure. Each step in the method may be adjusted based on actual conditions, and the disclosure is not limited thereto.

In step S310, the processing unit 155 transmits data packets (e.g., the data packets of multimedia data, document, system data, etc.) through the communication unit 151. In other words, the terminal nodes $190_1$ to $190_j$ and $195_1$ to $195_k$ download the data packets provided by the data server 150 individually through each of the upper nodes $170_1$ to $170_i$. For instance, when the terminal nodes $190_1$ to $190_j$ and $195_1$ to $195_k$ intend to download the same video from the data server 150, according to a packet length restricted by the transmission protocol, the data server 150 divides a video file into a number (e.g., 3, 20, 100, etc.) of the data packets to be transmitted to the terminal nodes $190_1$ to $190_j$ and $195_1$ to $195_k$ sequentially through the network switch 130 and the upper nodes $170_1$ to $170_i$. It should be noted that, the data packets transmitted at the time is not yet encoded (e.g., by the network coding).

In step S330, the processing unit 155 receives missing packet reports in which the terminal nodes $190_1$ to $190_j$ and $195_1$ to $195_k$ correspond to the data packets via the network switch 130 through the communication unit 151.

Specifically, after downloading the data packets in step S310, the terminal nodes $190_1$ to $190_j$ and $195_1$ to $195_k$ determine missing packets according to the received data packets. Subsequently, each of the terminal nodes $190_1$ to $190_j$ and $195_1$ to $195_k$ records an indication corresponding to the missing packets and an identification thereof to the missing packet reports, and transmits the missing packet reports to respective one of the upper nodes $170_1$ to $170_i$ to which the terminal nodes belong. Thereafter, the network switch 130 forwards the missing packet reports received from the upper nodes $170_1$ to $170_i$ to the data server 150.

In an embodiment, each of missing packet report includes the identification (e.g., the IP address, the MAC address or an international mobile subscriber identity (IMSI) of one of the terminal nodes $190_1$ to $190_j$ and $195_1$ to $195_k$ and the indication (e.g., an index value or a specific identification) corresponding to the missing packets. For example, Table (1) is an example of a format of the missing packet report.

The format of the missing packet report includes an index value of the missing packet and an identification of the terminal node. It should be noted that, in other examples, the missing packet report may have different formats and the identification of the terminal node may be the IP address or IMSI, which are not particularly limited in the disclosure.

TABLE 1

| Index value of missing packet | Identification of terminal node |
|---|---|
| 1, 3, 8, 10 | 00:A0:C9:14:C8:29 |

In step S350, the processing unit 155 obtains the network topology information related to the terminal nodes $190_1$ to $190_j$ and $195_1$ to $195_k$ via the network switch 130 through the communication unit 151. In an embodiment, the network switch 130 integrates the missing packet reports into a missing packet lookup table according to the address information (e.g., the IP address, the MAC address and/or identifications of the ports for connecting the network switch 130) of the corresponding upper nodes $170_1$ to $170_i$, and the control server 110 establishes the network topology information based on the missing packet lookup table. Specifically, although the control server 110 is capable of monitoring a network state and collecting a network topology on basis of the OpenFlow protocol, related information of addresses (e.g., the IP address, the MAC address, etc.) in the Intranet may not be obtained by using the existing OpenFlow protocol. Accordingly, the present embodiment of the disclosure proposes an address lookup table (e.g., a port-device-mapping table, a routing table, etc.) so that the control server 110 may obtain the network topology information related to the terminal nodes $190_1$ to $190_j$ and $195_1$ to $195_k$.

Based on the characteristics of the OpenFlow protocol, when one specific data packet reaches the network switch 130 for the first time, since the specific data packet cannot match to a routing path (e.g., a flow entry) in the control server 110, the network switch 130 transmits the specific data packet to the control server 110. Accordingly, in the present embodiment of the disclosure, when a specific missing packet reaches the control server 110 for the first time, the control server 110 records the specific missing packet to thereby establish the address lookup table.

In other words, the network topology information according to the present embodiment of the disclosure includes the address lookup table of the terminal nodes $190_1$ to $190_j$ and $195_1$ to $195_k$ and the upper nodes $170_1$ to $170_i$ to which the terminal nodes $190_1$ to $190_j$ and $195_1$ to $195_k$ belong. The control server 110 establishes the address lookup table based on the missing packet lookup table integrated by the network switch 130 or the missing packet reports reported from the terminal nodes $190_1$ to $190_j$ and $195_1$ to $195_k$, and use the address lookup table as the network topology information to be transmitted to the data server 150. For instance, Table (2) is an example of a format of the missing packet lookup table. The format of the missing packet lookup table includes the index value of the missing packet, the identification of the terminal node, the identification of the port used for connecting the upper node to which the terminal node belongs to the network switch 130 and an identification of the upper node to which the terminal node belongs.

TABLE 2

| Index value of missing packet | Identification of terminal node | Identification of port | Identification of upper node |
|---|---|---|---|
| 1, 3, 8, 10 | 00:A0:C9:14:C8:29 | 1 | 140.113.1.1 |

Further, Table (3) is an example of a format of the address lookup table. The format of the address lookup table includes the identification of the terminal node, the identification of the port used for connecting the upper node to which the terminal node belongs to the network switch 130 and an identification of the upper node to which the terminal node belongs. It should be noted that, in other examples, the missing packet lookup table and the address lookup table may have different formats, the identification of the terminal node may be the IP address or IMSI, and the identification of the upper node may be the MAC address or other identifications, which are not particularly limited in the disclosure.

TABLE 3

| Identification of terminal node | Identification of port | Identification of upper node |
|---|---|---|
| 00:A0:C9:14:C8:29 | 1 | 140.113.1.1 |
| 50:D8:D0:32:2:A6 | 1 | 140.113.1.1 |
| 2:A7:D0:65:11:E7 | 2 | 140.113.1.2 |
| 82:4:G9:72:B2:25 | 2 | 140.113.1.2 |
| 77:C0:2:54:A2:F4 | 2 | 140.113.1.2 |

In addition, when any new terminal device is connected to the upper nodes $170_1$ to $170_i$ or any one of the existing terminal devices $190_1$ to $190_j$ and $195_1$ to $195_k$ is disconnected from the corresponding upper nodes $170_1$ to $170_i$, the control server 110 updates the network topology information (e.g., the address lookup table) and retransmits the network topology information to the data server 150. On the other hand, in some other embodiments, it is possible that the upper nodes $170_1$ to $170_i$ and the terminal devices $190_1$ to $190_j$ and $195_1$ to $195_k$ are connected in the wired manner (e.g., connection made through the optical fiber or the cable). In this case, based on the OpenFlow protocol, the control server 110 may obtain related information of the terminal devices $190_1$ to $190_j$ and $195_1$ to $195_k$ and establishes the network topology information.

Subsequently, in step S370, the processing unit 155 encodes the missing packets in the data packets according to the missing packet reports and the network topology information. In an embodiment, the processing unit 155 calculates packet combinations of the missing packets according to the missing packet reports and the network topology information, and encodes the missing packets according to the packet combinations to generate the encoded packets. Herein, the processing unit 155 determines the upper nodes $170_1$ to $170_i$ to which each of the terminal nodes $190_1$ to $190_j$ and $195_1$ to $195_k$ belongs, and calculate each of the packet combinations according to the upper nodes $170_1$ to $170_i$ to which each of the terminal nodes $190_1$ to $190_j$ and $195_1$ to $195_k$ belongs and the corresponding missing packet reports.

Specifically, after receiving the network topology information through the communication unit 151, the processing unit 155 may look up the address lookup table according to the identification of one of the terminal nodes $190_1$ to $190_j$ and $195_1$ to $195_k$, so as to determine the upper nodes $170_1$ to $170_i$ of each of the terminal nodes $190_1$ to $190_j$ and $195_1$ to $195_k$. For instance, take Table (1) and Table (3) as an example, the processing unit 155 compares the identification of the terminal node (e.g., 00:A0:C9:14:C8:29) in Table (1) with the identification of the terminal node in Table (3), so as to be informed of the identification of the corresponding port (e.g., a port 1) and the identification of the upper node (e.g., 140.113.1.1).

In order to optimally calculate more preferable packet combinations for the missing packets in the disclosure, in an embodiment, according to the indication of missing packet reported from the terminal nodes that belong to the same upper node (e.g., the terminal nodes $190_1$ and $190_2$ that belong to the same upper node $170_1$ or the terminal nodes $195_1$ and $195_2$ that belong to the same upper node $170_i$ and so on), the processing unit 155 combines all the missing packets corresponding to the indication of missing packet or the missing packet selected by a specific method or selected randomly to serve as the packet combinations for encoding. For instance, Table (4) is an example of the packet combination. Therein, a packet content includes the missing packets (e.g., X1+X3+X8+X10 (based on an assumption in which the data packets are marked by X1 to X10)) of each of the terminal nodes that belong to the same upper node.

TABLE 4

| Index value of missing packet | Packet content | Identification of upper node |
|---|---|---|
| 1, 3, 8, 10 | X1 + X3 + X8 + X10 | 140.113.1.1 |

It should be noted that, in other embodiments, the processing unit 155 may also determine the packet combinations (i.e., the packet content in Table (4)) by using operating function based on, for example, the random linear network code (RLNC) according to the network topology information, but the present embodiment of the disclosure is not limited thereto.

Subsequently, in step S390, the processing unit 155 transmits the encoded packets encoded from the missing packets to the terminal nodes $190_1$ to $190_j$ and $195_1$ to $195_k$ via the network switch 130 and each of the upper nodes $170_1$ to $170_i$ through the communication unit 151. In an embodiment, each of the encoded packets includes the address information (e.g., the IP address, the MAC address or the identification of the port) of one of the corresponding upper nodes $170_1$ to $170_i$, the network switch 130 receives the encoded packets from the data server 150 and transmits each of the encoded packets individually to one of the corresponding upper nodes $170_1$ to $170_i$ according to the corresponding address information of each of the encoded packets, and each of the upper nodes $170_1$ to $170_i$ multicasts (e.g., by broadcasting, multicasting, etc.) one of the received encoded packets to the terminal nodes $190_1$ to $190_j$ and $195_1$ to $195_k$. For example, the network switch 130 determines the corresponding port according to the identification of the terminal node in Table (3) or Table (4), and then transmits each of the encoded packets to the upper nodes $170_1$ to $170_i$ via the corresponding port. Subsequently, take the upper node $170_1$ for example, the upper node $170_1$ may transmit the received encoded packets to the all of the terminal nodes $190_1$ to $190_j$, and the rest may be deduced by analogy. Thereafter, the terminal nodes $190_1$ to $190_j$ and $195_1$ to $195_k$ may decode the encoded packets to obtain the respective missing packets.

Therefore, in comparison with the traditional retransmission mechanism, other than reduction in the number of times for retransmitting, the method for retransmitting packet according to the embodiments of the disclosure may further improve the efficiency of the packet retransmission and save the network bandwidth. To facilitate in understanding more of the steps in the foregoing embodiments, an example is provided below to describe operation flow for applying the embodiments of the disclosure.

Figure 4A:
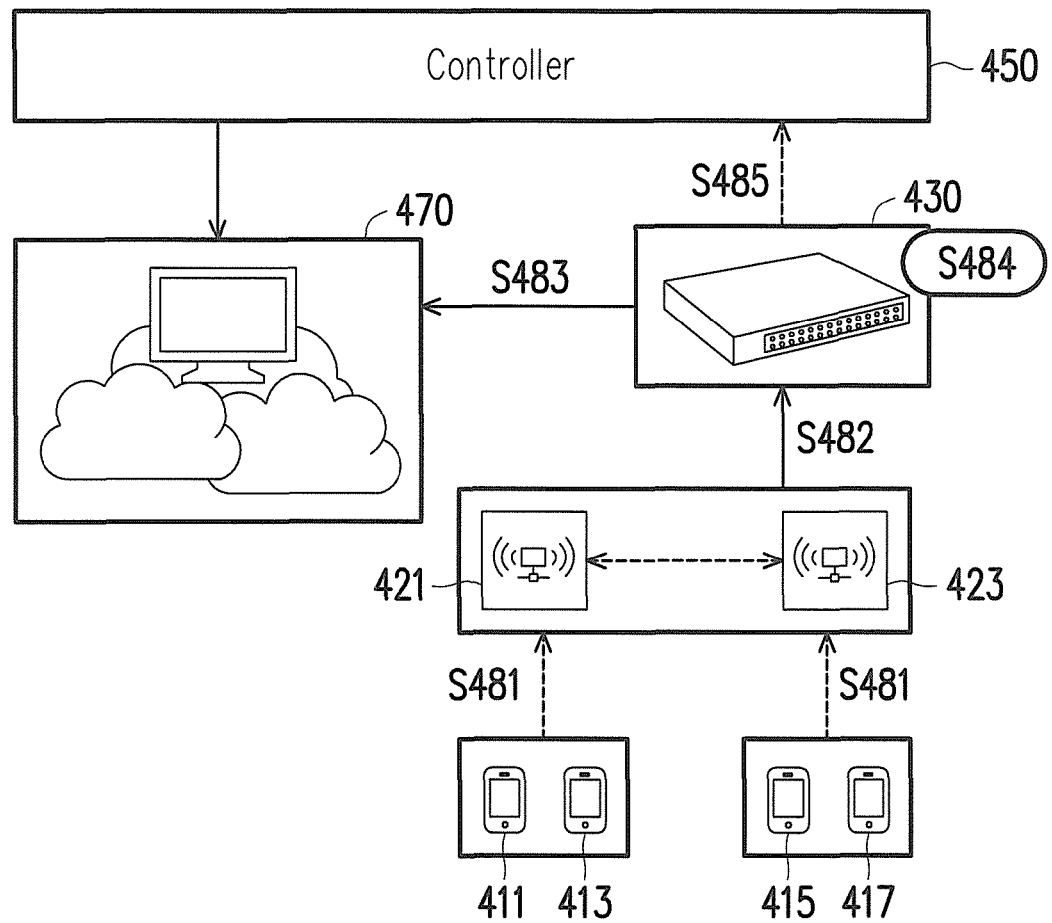
FIG. 4A and FIG. 4B are examples for packet transmission.
Figure 4B:
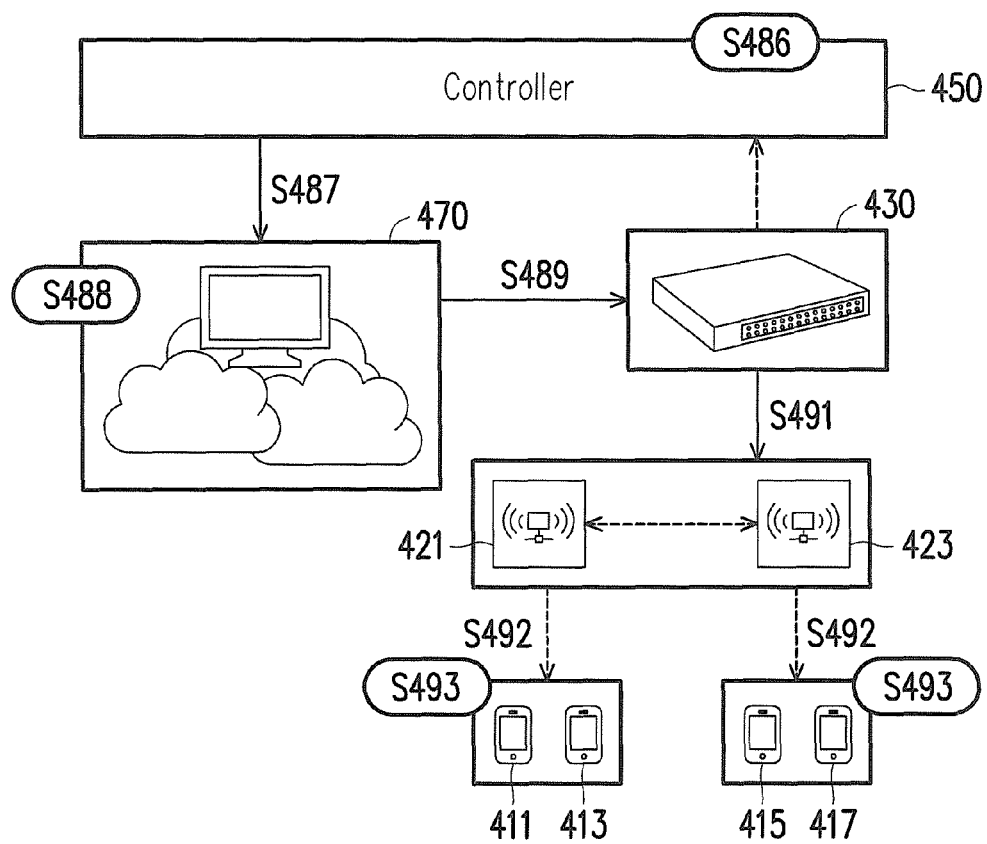

FIG. 4A and FIG. 4B are examples for packet transmission. Referring to FIG. 4A first, a wireless network environment includes four user equipments 411, 413, 415 and 417, two Wi-Fi access points 421 and 423, an OpenFlow switch 430, a SDN controller 450 and a cloud server 470. After the Wi-Fi access points 421 and 423 broadcast the data packets, each of the user equipments 411, 413, 415 and 417 reports the missing packets and an user identification (step S481) to be transmitted via the OpenFlow switch 430 (step S482) to the cloud server 470 (step S483). Hereinafter, it is assumed that the cloud server 470 transmits the data packets X1 to X10, and Tables (5) to Table (8) are the missing packet reports of the user equipments 411, 413, 415 and 417, respectively. Accordingly, the cloud server 470 obtains the missing packet reports similar to Tables (5) to Table (8).

TABLE 5

| Index value of missing packet | Identification of terminal node |
|---|---|
| 2, 5, 6 | 50:D8:D0:32:2:A6 |

TABLE 6

| Index value of missing packet | Identification of terminal node |
|---|---|
| 1, 5 | 2:A7:D0:65:11:E7 |

TABLE 7

| Index value of missing packet | Identification of terminal node |
|---|---|
| 3, 4, 7 | 82:4:G9:72:B2:25 |

TABLE 8

| Index value of missing packet | Identification of terminal node |
|---|---|
| 8, 10 | 77:C0:2:54:A2:F4 |

In step S484, when the OpenFlow switch 430 receives the missing packet reports from the user equipments 411, 413, 415 and 417, the OpenFlow switch 430 adds the IP addresses of the Wi-Fi access points 421 and 423 to the missing packet lookup table to serve as the new missing packet reports. Herein, it is assumed that Table (9) is the missing packet lookup table. Subsequently, the OpenFlow switch 430 transmits this missing packet lookup table to the SDN controller 450 (step S485).

TABLE 9

| Index value of missing packet | Identification of terminal node | Identification of port | IP address of upper node |
|---|---|---|---|
| 2, 5, 6 | 50:D8:D0:32:2:A6 | 1 | 140.113.1.1 |
| 1, 5 | 2:A7:D0:65:11:E7 | 1 | 140.113.1.1 |
| 3, 4, 7 | 82:4:G9:72:B2:25 | 2 | 140.113.1.2 |
| 8, 10 | 77:C0:2:54:A2:F4 | 2 | 140.113.1.2 |

Referring to FIG. 4B, in step S486, the SDN controller 450 establishes a port-device-mapping table according to the missing packet lookup table, and then updates the port-device-mapping table according to the new user device being added or any of the user equipments 411, 413, 415 and 417 being disconnected. Herein, it is assumed that Table (10) is the port-device-mapping table. Subsequently, the SDN controller 450 transmits the port-device-mapping table to the cloud server 470 (step S487).

TABLE 10

| IP address of upper node | Identification of terminal node | Identification of port |
|---|---|---|
| 140.113.1.1 | 50:D8:D0:32:2:A6 | 1 |
| 140.113.1.1 | 2:A7:D0:65:11:E7 | 1 |
| 140.113.1.2 | 82:4:G9:72:B2:25 | 2 |
| 140.113.1.2 | 77:C0:2:54:A2:F4 | 2 |

In step S488, the cloud server 470 randomly encodes the missing packets according to the port-device mapping table. In this example, it is assumed that an encoding coefficient α selects GF(2), the encoding coefficient α is equal to 0 or 1. Table (11) is a lookup table in which the packet combinations correspond to each of Wi-Fi access points 421 and 423. After encoding the missing packets by the cloud server 470, the encoded packet Y1 is equal to X2+X5+X6, and the cloud server 470 transmits the encoded packets to the OpenFlow switch 430 (step S489). The OpenFlow switch 430 then transmits the encoded packets to the corresponding Wi-Fi access points 421 and 423 (step S491). Subsequently, the Wi-Fi access points 421 and 423 multicast the encoded packets to the user equipments 411, 413, 415 and 417 (step S492). Subsequently, the Wi-Fi access point 421 may multicast the encoded packet Y1 to the user equipments 411 and 413 by broadcasting. The user equipments 411, 413, 415 and 417 may decode the received encoded packets to obtain the missing packets (step S493). Herein, if the missing packets are still present after the user equipments 411, 413, 415 and 417 decodes the received encoded packets, the user equipments 411, 413, 415 and 417 may return back to execute step S481 until all of the data packets are received completely.

In summary, the embodiments of the disclosure combine the network coding and the system architecture of SDN to encode the missing packets of the terminal nodes through the data server according to the network topology information provided by the control server, and perform a differential broadcasting for packet retransmission via the upper nodes to conduct an accurate transmission corresponding to the missing packets missed by the terminal nodes. Accordingly, the embodiments of the disclosure not only improve the efficiency of the packet retransmission but also improve the efficient of the multicasting without increasing computation and transmission costs for wireless nodes.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method for retransmitting packet, adapted for a data server, the method comprising: transmitting a plurality of data packets; receiving a plurality of missing packet reports in which the data packets correspond to a plurality of terminal nodes; obtaining network topology information related to the terminal nodes; determining a plurality of first terminal nodes of the terminal nodes, and determining a plurality of second terminal nodes of the terminal nodes, wherein the first terminal nodes belong to a first upper node and the second terminal nodes belong to a second upper node different from the first upper node; encoding a plurality of first missing packets for the first terminal nodes belonging to the first upper node in a first recovery packet according to the missing packet reports and the network topology information, wherein the first recovery packet is encoded only from the first missing packets reported missing by the first terminal nodes; encoding a plurality of second missing packets for the second terminal nodes belonging to the second upper node in a second recovery packet different from the first recovery packet according to the missing packet reports and the network topology information, wherein the second recovery packet is encoded only from the second missing packets reported missing by the second terminal nodes; transmitting the first recovery packet encoded from the first missing packets to the first upper node; and transmitting the second recovery packet encoded from the second missing packets to the second upper node, wherein each of the missing packet reports comprises an identification of one of the terminal nodes and an indication corresponding to the missing packets, the network topology information comprises an address lookup table of the terminal nodes and the upper node to which the terminal nodes belong, and wherein the step of encoding the missing packets for the terminal nodes belong to the upper node in the recovery packet according to the missing packet reports and the network topology information comprises: determining the upper node of each of the terminal nodes by looking up the address lookup table according to the identification of one of the terminal nodes in each of the missing packet reports.

2. The method according to claim 1, wherein the step of encoding the missing packets for the terminal nodes belonging to the upper node in the recovery packet according to the missing packet reports and the network topology information comprises:
calculating a plurality of packet combinations of the missing packets according to the missing packet reports and the network topology information; and
encoding the missing packets according to the packet combinations to generate the recovery packet.

3. The method according to claim 2, wherein the step of calculating the packet combinations of the missing packets according to the missing packet reports and the network topology information comprises: calculating each of the packet combinations according to the upper node to which each of the terminal nodes belongs and the corresponding missing packet reports.

4. A data server, comprising: a communication unit, configured to transmit a plurality of data packets; a storage unit, configured to store network topology information; and a processing unit, coupled to the communication unit and the storage unit, wherein the processing unit receives a plurality of missing packet reports in which the data packets correspond to a plurality of terminal nodes through the communication unit, obtains the network topology information related to the terminal nodes through the communication unit, determines a plurality of first terminal nodes of the terminal nodes, and determines a plurality of second terminal nodes of the terminal nodes, wherein the first terminal nodes belong to a first upper node and the second terminal nodes belong to a second upper node different from the first upper node, wherein the processing unit encodes a plurality of first missing packets for the first terminal nodes belonging to the first upper node in a first recovery packet according to the missing packet reports and the network topology information, wherein the first recovery packet is encoded only from the first missing packets reported missing by the first terminal nodes, wherein the processing unit encodes a plurality of second missing packets for the second terminal nodes belonging to the second upper node in a second recovery packet different from the first recovery packet according to the missing packet reports and the network topology information, wherein the second recovery packet is encoded only from the second missing packets reported missing by the second terminal nodes, wherein the processor transmits the first recovery packet encoded from the first missing packets to the first upper node through the communication unit, and transmits the second recovery packet encoded from the second missing packets to the second upper node through the communication unit, wherein each of the missing packet reports comprises an identification of one of the terminal nodes and an indication corresponding to the missing packets, the network topology information comprises an address lookup table of the terminal nodes and the upper node to which the terminal nodes belong, and the processing unit determines the upper node of each of the terminal nodes by looking up the address lookup table according to the identification of one of the terminal nodes in each of the missing packet reports.

5. The data server according to claim 4, wherein the processing unit, calculates each plurality of the packet combinations of the missing packets according to the missing packet reports and the network topology information, and encodes the missing packets according to the packet combinations to generate the recovery packet.

6. The data server according to claim 5, wherein the processing unit calculates each of packet combinations according to the upper node to which each of the terminal nodes belongs and the corresponding missing packets reports.

7. A packet retransmitting system, comprising: a control server, configured to establish network topology information; a network switch, coupled to the control server; a plurality of upper nodes, individually coupled to the network switch, wherein each of the upper nodes provides a network service to a plurality of terminal nodes; and a data server, coupled to the control server and the network switch, wherein the terminal nodes download a plurality of data packets provided by the data server through the upper nodes, respectively, and the data server receives a plurality of missing packet reports in which the data packets correspond to the terminal nodes via the network switch, obtains the network topology information related to the terminal nodes from the control server, determines a plurality of first terminal nodes of the terminal nodes, and determines a plurality of second terminal nodes of the terminal nodes, wherein the first terminal nodes belong to a first upper node of the upper nodes and the second terminal nodes belong to a second upper node of the upper nodes , the second upper node is different from the first upper node, wherein the data server encodes a plurality of first missing packets for the first terminal nodes belonging to the first upper node in a first recovery packet according to the missing packet reports and the network topology information, wherein the first recovery packet is encoded only from the first missing packets reported missing by the first terminal nodes, wherein the data server encodes a plurality of second missing packets for the second terminal nodes belonging to the second upper node in a second recovery packet different from the first recovery packet according to the missing packet reports and the network topology information, wherein the second recovery packet is encoded only from the second missing packets reported missing by the second terminal nodes, wherein the data server transmits the first recovery packet encoded from the first missing packets to the first upper node, and transmits the second recovery packet encoded from the second missing packets to the second upper node, wherein each of the missing packet reports comprises an identification of one of the terminal nodes and an indication corresponding to the missing packets, the network topology information comprises an address lookup table of the terminal nodes and one of the upper nodes to which the terminal nodes belong, and the data server determines one of the upper nodes to which each of the terminal nodes belongs by looking up the address lookup table according to the identification of one of the terminal nodes in each of the missing packet reports.

8. The packet retransmitting system according to claim 7, wherein the data server calculates a plurality of packet combinations of the missing packets according to the missing packet reports and the network topology information, and encodes the missing packets according to the packet combinations to generate the recovery packet.

9. The packet retransmitting system according to claim 8, wherein the data server calculates each of the packet combinations according to one of the upper nodes to which each of the terminal nodes belongs and the corresponding missing packet reports.

10. The packet retransmitting system according to claim 8, wherein each of the recovery packets comprises address information of one of the corresponding upper nodes, the network switch receives the recovery packets from the data server and transmits each of the recovery packets individually to one of the corresponding upper nodes according to the corresponding address information of each of the recovery packets, and each of the upper nodes multicasts one of the received recovery packets to the terminal nodes.

11. The packet retransmitting system according to claim 7, wherein the network switch comprises an OpenFlow switch, and the control server comprises a software-define networking (SDN) controller, wherein the OpenFlow switch integrates the missing packet reports into a missing packet lookup table according to the address information of the corresponding upper nodes, and the software-defined network controller establishes the network topology information based on the missing packet lookup table.

* * * * *